United States Patent
Day et al.

(10) Patent No.: US 6,266,464 B1
(45) Date of Patent: Jul. 24, 2001

(54) OPTICAL ARRAYED WAVEGUIDE GRATING DEVICES

(75) Inventors: Stephen Day, Harlow; James E Whiteaway, Sawbridgeworth; Alan Fielding, Bishop's Stortford; Terry Clapp, Standon, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/471,444

(22) Filed: Dec. 23, 1999

(51) Int. Cl.[7] ....................................... G02B 6/34
(52) U.S. Cl. .................. 385/37; 385/24; 385/28; 385/14; 359/130
(58) Field of Search .................. 385/14, 28, 29, 385/37, 24; 359/130

(56) References Cited

U.S. PATENT DOCUMENTS

| 5,629,992 | | 5/1997 | Amersfoort et al. |  |
|---|---|---|---|---|
| 6,069,990 | * | 5/2000 | Okawa et al. | 385/24 |
| 6,141,152 | * | 10/2000 | Trouchet | 385/37 |
| 6,188,818 | * | 2/2001 | Han et al. | 385/24 |
| 6,195,482 | * | 2/2001 | Dragone | 385/37 |

OTHER PUBLICATIONS

C Dragone et al., 'Integrated Optics N×N Multiplexer on Silicon', IEEE Photonics Technology Letters, vol. 3, No. 10, Oct. 1991, pp. 896–899.
Pp. 90–91 of the book by J Carroll et al. entitled, 'Distributed feedback semiconductor lasers' published 1998 by The Institute of Electrical Engineers (ISBN 0 85296 917 1).

* cited by examiner

Primary Examiner—Darren Schuberg
Assistant Examiner—Fayez Assaf
(74) Attorney, Agent, or Firm—Lee, Mann, Smith, McWilliams, Sweeney & Ohlson

(57) ABSTRACT

It is found that the use of a multimode interference (MMI) section to flatten the pass-bands of an arrayed waveguide grating (AWG) multiplexer/demultiplexer or comb filter introduces undesirable non-linear wavelength dispersion into those pass-bands if that MMI section mixes modes of more than two different orders. This dispersion can be substantially compensated by the use of a tandem arrangement of two AWGs with MMIs of differing length chosen to provide complementary dispersions. In the case of a comb filter, an equivalent compensation can be achieved by arranging for the light to make a second passage through the AWG in the reverse direction.

4 Claims, 13 Drawing Sheets

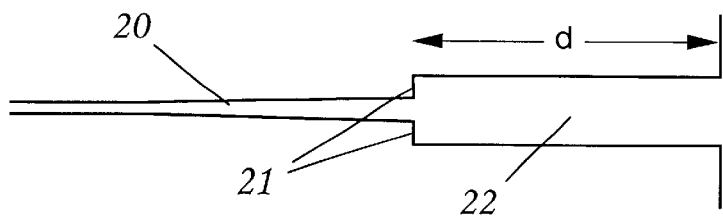
Fig. 2.
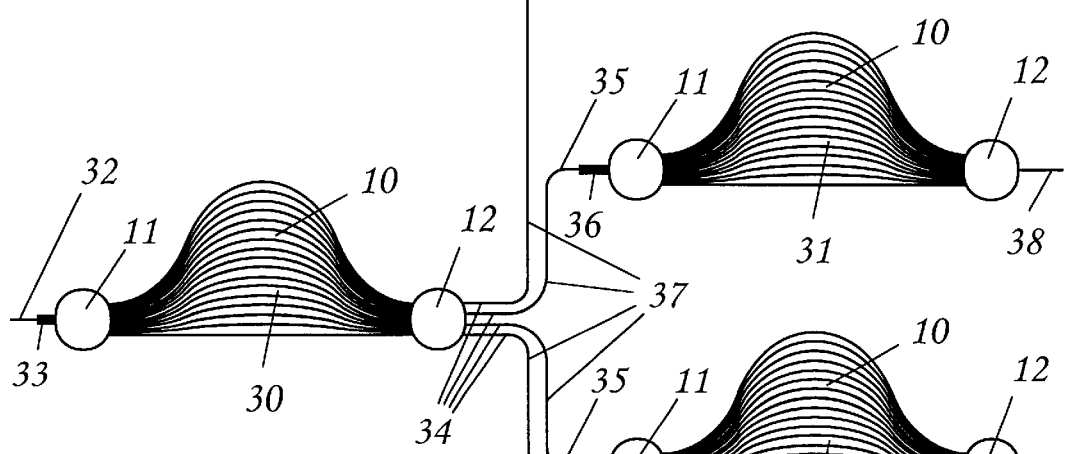
Fig. 3.
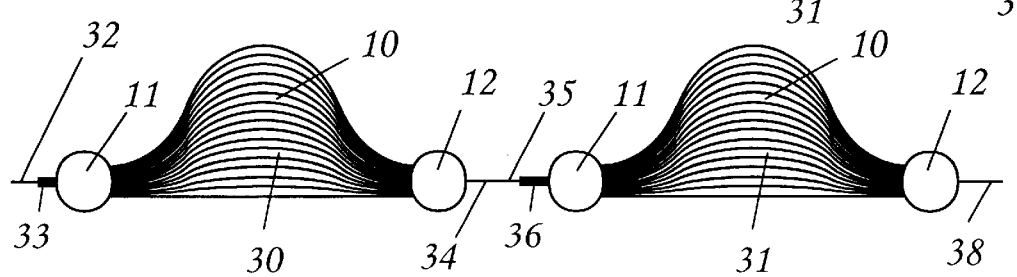

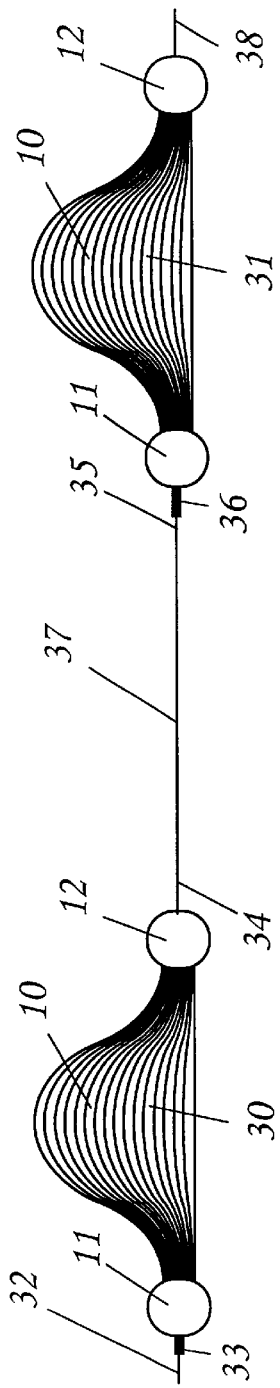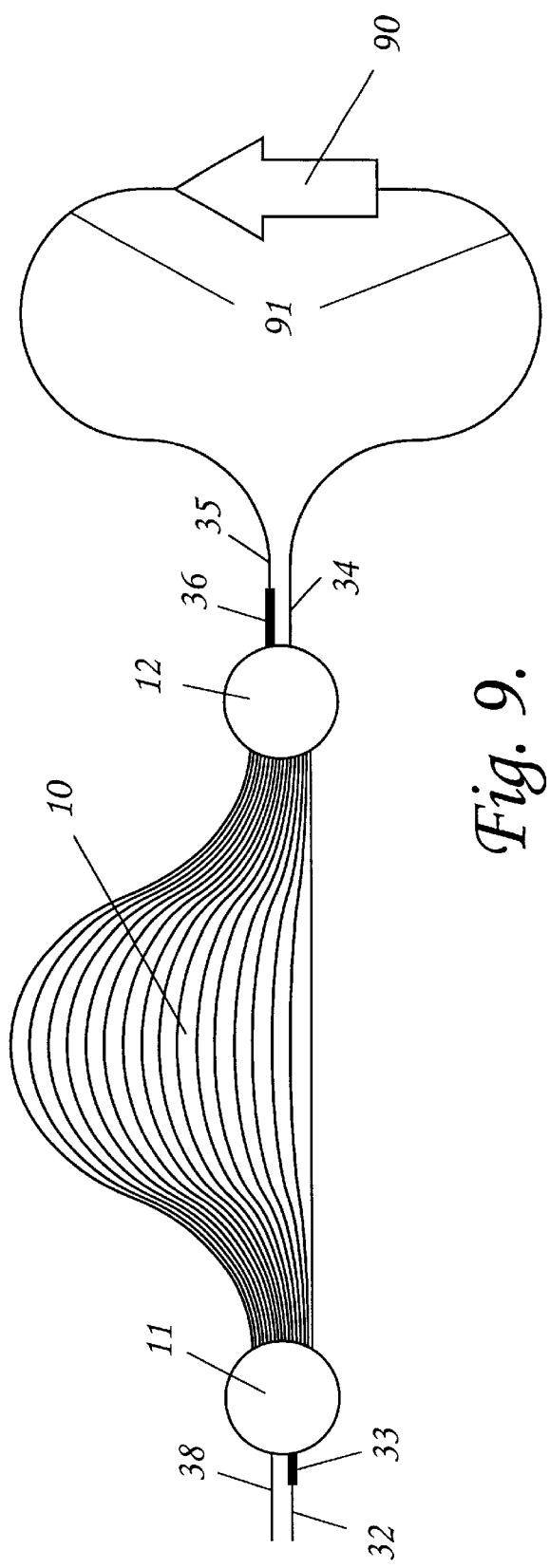
Fig. 8.
Fig. 9.

OPTICAL ARRAYED WAVEGUIDE GRATING DEVICES

FIELD OF THE INVENTION

This invention relates to optical arrayed waveguide grating (AWG) devices, particularly such devices suitable for use as optical wavelength multiplexers, demultiplexers, or filters. Such devices find particular, but not necessarily exclusive, application in wavelength division multiplexed (WDM) optical transmission systems.

BACKGROUND TO THE INVENTION

WDM optical transmission systems ideally require passive optical wavelength multiplexers, demultiplexers and filters which ideally should have isolated pass-bands which are flat-topped so as to allow a measure of tolerance in the spectral positioning of the individual signals of the WDM system within these pass-bands. One method of multiplexing, demultiplexing or filtering channels in an optical WDM system relies upon the use of multilayer dielectric interference filters. Another relies upon Bragg reflection effects created in optical fibres. A third method, the method with which the present invention is particularly concerned, relies upon diffraction grating effects.

The particular format of optical waveguide diffraction grating with which the present invention is concerned is derived from the format that includes a set of optical waveguides in side-by-side array, each extending from one end of the array to the other, and being of uniformly incrementally greater optical path length from the shortest at one side of the array to the longest at the other. Such an optical grating, sometimes known as an arrayed waveguide grating (AWG), constitutes a component of the multiplexer described by C Dragone et al., 'Integrated Optics N×N Multiplexer on Silicon', IEEE Photonics Technology Letters, Vol. 3, No. 10, October 1991, pages 896–9. Referring to accompanying FIG. 1, the basic components of a 4×4 version of such a multiplexer comprise an optical waveguide grating array, indicated generally at 10, whose two ends are optically coupled by radiative stars, indicated schematically at 11 and 12, respectively with input and output sets of waveguides 13 and 14. Monochromatic light launched into one of the waveguides of set 13 spreads out in radiative star 11 to illuminate the input ends of all the waveguides of the grating 10. At the far end of the grating 10 the field components of the emergent light interfere coherently in the far-field to produce a single bright spot at the far side of the radiative star 12. Increasing the wavelength of the light causes a slip in the phase relationship of these field components, with the result that the bright spot traverses the inboard ends of the output set of waveguides 14 as depicted at 15. If the mode size of the waveguides 14 is well matched with the size of the bright spot, then efficient coupling occurs at each of the wavelengths at which the bright spot precisely registers with one of those waveguides 14.

The difference in optical path length between the inboard end of a waveguide 13 and that of a waveguide 14 via adjacent waveguides in the array 10 (the optical path length of a waveguide being the product of its physical length with its effective refractive index) determines the value of the Free Spectral Range (FSR) of the grating for this particular pair of waveguides, being the frequency range over which this difference in optical path length produces a phase difference whose value ranges over $2\pi$ radians. Accordingly the single bright spot is produced in the same position each time the optical frequency of the light is changed by an amount corresponding to a frequency difference that is an integral number of FSRs. It can thus be seen that, for optical transmission from any particular one of the set of waveguides 13 to any particular one of the set of waveguides 14, the device of FIG. 1 operates as a comb filter whose teeth are spaced in frequency by the FSR of its grating 10. The propagation distances across the radiative stars themselves contribute to the FSR of any particular combination of waveguide 13 and waveguide 14, and so not all the FSRs are precisely identical.

The movement of the bright spot across the end of the particular waveguide 14 that occurs in consequence of a change of wavelength, results in an approximately Gaussian transmission pass-band for each channel of the multiplexer/demultiplexer. For operation in a practical WDM transmission system a more nearly flat-topped transmission pass-band is generally a requirement in order to avoid excessive uncertainties in the value of insertion loss that the device is liable to provide as the result of tolerances allowed for in the emission wavelengths of the optical sources employed in that transmission system, and to allow for the modulation bandwidth of the signals transmitted in the individual WDM channels. In this context, it may be noted that the drive to narrower channel spacings will typically aggravate this problem because, in general, the tolerances imposed upon the precision of source wavelengths are not tightened in proportion to the narrowing of the channel spacings, and/or the modulation bandwidth tends to constitute a greater proportion of the channel spacing.

In U.S. Pat. No. 5,629,992 there is described a method of providing a measure of flattening of the transmission pass-band of an AWG this method involving the interposing of a length of wider waveguide between the input waveguide 13 and the first star coupler 11. This wider waveguide (also known as a multimode interference (MMI), or mixer, waveguide section) is capable of guiding, not only the zeroth order mode, but also the second order mode, both of which are excited by the launch of zeroth order mode power into it from the waveguide 13 because the transition between the waveguide 13 and its MMI section is abrupt, i.e. is non-adiabatic. These two modes propagate with slightly different velocities, and the length of the wider waveguide is chosen to be of a value which causes $\pi$ radians of phase slippage between them. Under these conditions, the field distribution that emerges into the star coupler 11 from the end of the wider waveguide is double peaked. The image of this field distribution is formed at the end of star coupler 12 that is abutted by the waveguides 14. The overlap integral between this image and the field distribution of the zeroth order mode of any one of the waveguides 14 then determines the transmission spectrum afforded by the device in respect of the coupling to that waveguide. The amount of band-pass flattening thereby occasioned can be expressed in terms of an increase in the value of a Figure of Merit (FoM) parameter arbitrarily defined as the ratio of the −0.5 dB pass-band width to the −30.0 dB pass-band width. A significant drawback of the mixer section approach to pass-band flattening is that the insertion loss is intrinsically increased consequent upon the mismatch between the size of the flattened field distribution that is incident upon the inboard end of the output waveguide 14 and that of the field distribution of the zeroth order mode that is guided by that waveguide 14. By way of example, a mixer section supporting the zeroth and second order modes can be employed to increase the FoM of an AWG from about 0.14 to about 0.30, but this improvement in FoM is achieved at the expense of increasing the insertion loss of the device by approximately 2 dB. Further flattening can be obtained by widening still further the width of the mixer section to enable it to guide a larger number of even order modes, but this introduces yet higher increases in insertion loss. For instance, if the FoM is increased in this way to about 0.45, this is achieved at the expense of an excess insertion loss of approximately 4 dB. (No explicit mention has been made concerning the propagation of modes of odd order number in the MMI section. This is because generally the MMI section and the input waveguide will be arranged symmetrically with respect to each other so that zeroth order mode power launched into the MMI from the input waveguide will not excite modes of odd order number.)

One factor not specifically addressed in the foregoing discussion is the chromatic dispersion afforded by these AWG multiplexer/demultiplexer devices. The deleterious effects of chromatic dispersion becomes more significant as the bit rate of traffic being transmitted in individual channels is increased.

SUMMARY OF THE INVENTION

An object of the present invention is to provide AWG-based multiplexer/demultiplexer and comb filter devices that exhibit not only relatively flat-topped and well isolated pass-bands, but also relatively low dispersion.

According to a first aspect of the present invention, there is provided an arrayed waveguide grating device having an input/output waveguide optically coupled with an output/input waveguide via an optical path that includes, optically in series, first and second arrayed waveguide gratings configured to exhibit matched free spectral ranges to said optical path, each of which arrayed waveguide gratings having first and second ends respectively terminating in first and second radiative star couplers associated with that arrayed waveguide grating, which optical path additionally includes an intermediate waveguide that optically couples the second radiative star coupler of the first arrayed waveguide grating with the first radiative star coupler of the second arrayed waveguide, and which optical path also includes first and second multimode interference waveguide sections respectively terminating in one of the radiative star couplers of the first arrayed waveguide grating and in one of the radiative star couplers of the second arrayed waveguide grating, and wherein the first and second multimode interference waveguide sections support at least the zeroth, second and fourth order modes, and their relative lengths are such that, in respect of light launched into their respective waveguides, they produce, where they terminate in their respective radiative star couplers, field distribution phase fronts possessing substantially complementary curvatures.

The waveguides of the arrayed waveguide grating devices, and the input/output, output/input and intermediate waveguides are not necessarily strictly single mode waveguides, but if, in addition to guiding the zeroth order mode, any of these waveguides does guide one or more higher order modes, then it is constructed so that those higher order modes are much more heavily attenuated than the zeroth order mode because the end-to-end propagation of higher order mode power in such a waveguide is generally found to be detrimental to device operation. Nor are these waveguides necessarily of the same cross-section throughout their end-to-end length, but may, for instance, incorporate one or more adiabatic tapers.

According to a second aspect of the present invention, there is provided an arrayed waveguide grating comb filter device having an arrayed waveguide grating optically coupled via a first radiative star coupler with first and second waveguides, respectively constituting an input/output port and an output/input port of the device, and coupled via a second radiative star coupler with third and fourth waveguides, which comb filter also includes first and second multimode interference waveguide sections each of which supports at least the zeroth, second and fourth order modes and provides an indirect coupling between a respective one of two of said first to fourth waveguides and its respective one of said first and second radiative star couplers while each of the other two of said first to fourth waveguides is directly coupled with its respective one of said first and second radiative star couplers, wherein the third waveguide is optically coupled with the fourth waveguide via an optical isolator, and wherein the relative lengths of the first and second multimode interference waveguide sections are such that, in respect of light launched into their respective waveguides, they produce, where they terminate in their respective radiative star couplers, field distribution phase fronts possessing substantially complementary curvatures.

Other features and advantages of the invention will be readily apparent from, the following description of preferred embodiments of the invention, from the drawings and from the claims.

BRIEF DESCRIPTION OF THE DRAWINGS

FIG. 2 is a schematic diagram of a optical waveguide terminating in a multimode interference (MMI) section, FIG. 3 is a schematic diagram of an optical multiplexer/demultiplexer device constructed in accordance with the teachings of the present invention.

DETAILED DESCRIPTION OF PREFERRED EMBODIMENTS

In FIG. 2 there is schematically depicted an indeterminate length of optical waveguide 20 terminating abruptly (non-adiabatically) at 21 in a multimode interference (MMI) section constituted by a section of multimode optical waveguide 22 of specific length 'd'. The field distribution of the zeroth order mode of waveguide 20 does not exactly match that of the zeroth order mode of multimode waveguide 22 and so, when the zeroth order mode of waveguide 20 is launched into waveguide 22 at the junction 21 between these two waveguides, not only is the fundamental (zeroth order) mode of waveguide 22 excited, but also one or more additional (higher order) modes. Provided that the two waveguides are coaxial, only even order higher order modes are excited. These modes have different propagation constants. Accordingly progressive phase slippage occurs between the zeroth and second order modes as they propagate away from junction 21. At the distance at which this slippage amounts to π, these two modes combine to produce a field distribution that, in comparison with the near-Gaussian field distribution of the zeroth order mode on its own, is more nearly flat-topped, even though it is double peaked, exhibiting a slight dip in the centre. If other modes are also present, they will modify still further the field distribution but, in a conventional design of MMI section for an AWG, the MMI section is dimensioned so that the third order mode is only just below cut-off and so that still higher order modes are strongly cut-off. If the MMI section does not support any mode higher than the second order mode, and if the MMI section were long enough, then the combined field distribution would be repeated at each position further along the multimode waveguide 22 at which the phase slippage has been augmented by a further 2π. (If however the MMI section were to support three or more modes excited by power launched from the waveguide 20, then there would not, in general, be this cyclic pattern because different pairs of modes generally have different propagation constant differences, and hence different rates of phase slippage.)

It is generally the case that the shape of the field distribution at the far end of the MMI waveguide 22 is determined substantially exclusively by the interference of the guided modes of that waveguide. Therefore, if the multimode waveguide 22 is dimensioned so as not to guide the fourth or any higher order modes, it is only the interference between the zeroth and second order modes that needs to be taken into consideration in the determination of the field distribution at the far end of that waveguide.

Figure 1:
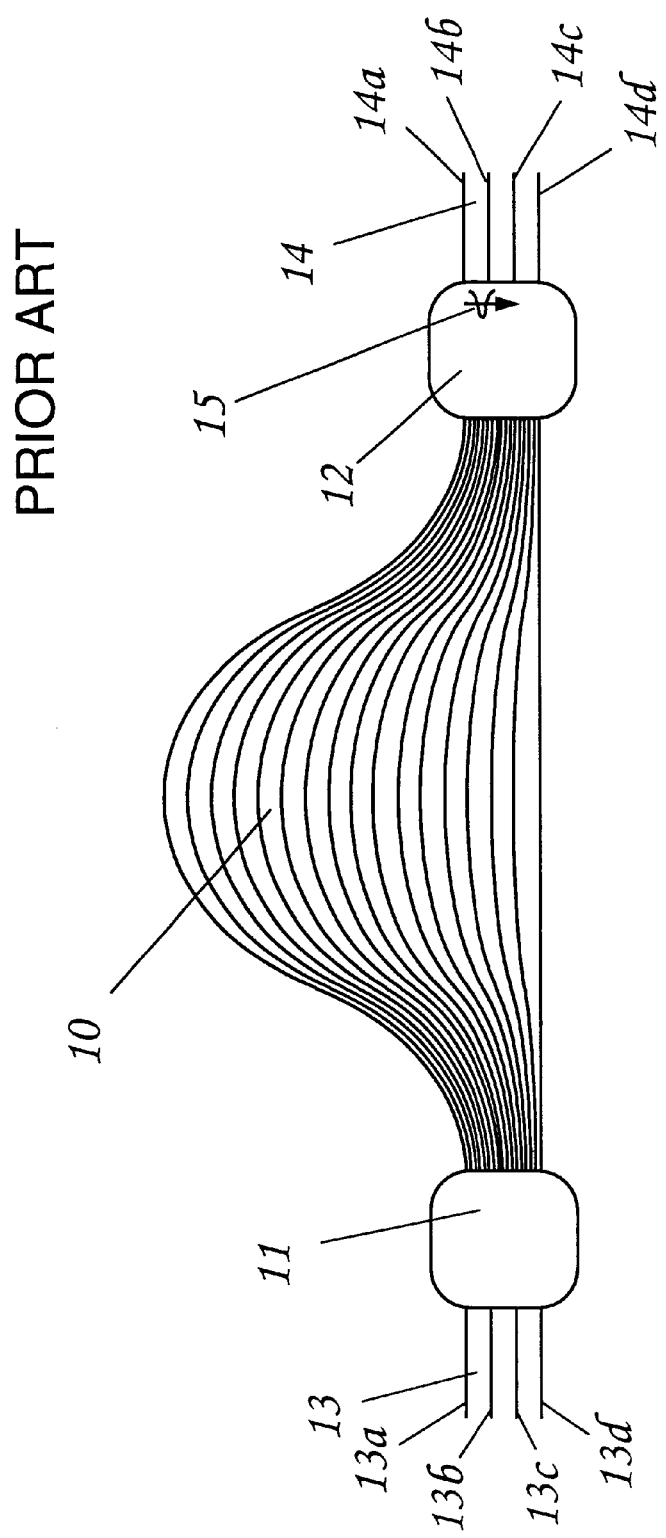
FIG. 1 (to which previous reference has already been made) schematically depicts a prior art employing an optical waveguide type diffraction grating.

Reverting attention to FIG. 1, if the set of waveguides 13 were to be replaced with a single MMI-terminated waveguide as depicted in FIG. 2, whose MMI section dimensioned so that the third order mode is only just below cut-off and so that still higher order modes are strongly cut-off, and whose length 'd' provides a phase slippage of π between its zeroth and second order guided modes, then the resulting double-peaked field distribution launched into the first star coupler 11 will be re-imaged at the exit end of the second star coupler 12, the end to which the waveguides 14 are abutted. A similar imaging will also occur if the MMI section is modified to be additionally capable of guiding the fourth order mode and, optionally, even higher even order modes. The difference in propagation constant between the zeroth and second order modes is not generally equal to the difference in propagation constant between the second and fourth order modes. (More generally, different consecutive pairs of even order modes have different propagation constant differences.) Accordingly, the optimum field distribution obtainable from the mixing of the zeroth, second and fourth order modes, in terms of the flatness of its top and the steepness of its sides, and optimum that is better than that obtainable from the mixing of only the zeroth and second order modes, occurs for an MMI section length affording a phase slippage between the zeroth and second order modes not exactly equal to π.

It has been found that a further consequence of the different magnitudes of propagation constant differences is that the phase front of the field distribution that is launched into star coupler 11 is no longer substantially planar, but has a significant curvature. The re-imaging by the array 10 of the complex field distribution on to the exit end of the second star coupler 12, in the presence of this phase front curvature, then gives rise to a non-linear phase response expressed as a function of wavelength or optical frequency. In other words, the inclusion of the additional mode, though it enables the further improvement of the re-imaged field distribution, it achieves this benefit at the expense of introducing a non-linear term into the phase response exhibited by the device. This non-linearity is a serious disadvantage in systems requiring tight management of dispersion, i.e. group delay that is wavelength dependent across individual passbands of the device. This is because it means that there is, in general, an uncertainty in both the magnitude and the sign of the dispersion that the device will afford to a signal propagating through it, this being determined according as whether this signal is nearer the top end of its signal channel or nearer the bottom end.

In a number of circumstances a concatenation of two AWG devices is required to achieve inter-channel cross-talk levels that are low enough to satisfy a given system specification. It has been found that in such circumstances it is possible to provide the two AWGs of the concatenation with MMIs of different lengths that are inter-related so that the non-linear dispersion term introduced by the MMI section of the first AWG is substantially compensated by that introduced by the MMI section of the second. In other words, it has been found possible to design MMI sections to produce field distributions that have substantially complementary curvatures.

Attention is now turned to FIG. 3, which schematically depicts a multiplexer/demultiplexer device constructed in accordance with the teachings of the present invention. This device has a single (1×N) AWG multiplexer/demultiplexer unit 30, to which are connected, in tree configuration, a set of N (1×1) AWG filter units 31. (For convenience of illustration, FIG. 3 depicts a device in which N=4, but it will be appreciated that examples in which N≠4 are equally valid.) All of the units 30 and 31 have the same general layout of gratings 10 and radiative stars 11 and 12 which are arranged in the same arrangement as in the multiplexer/demultiplexer device of FIG. 1. The gratings 10 are gratings constructed from waveguide. Instead of a set of waveguides 13, as depicted in the multiplexer/demultiplexer device of FIG. 1, the AWG multiplexer/demultiplexer unit 30 of FIG. 3 has a single MMI-terminated waveguide as depicted in FIG. 2, its waveguide being depicted at 32 and its MMI section at 33. To the exit end of the second star coupler 12 of the multiplexer/demultiplexer unit 30 is connected a set of waveguides 34 corresponding to the set of waveguides 14 of the device of FIG. 1. Similarly, instead of a set of waveguides 13 as depicted in the multiplexer/demultiplexer device of FIG. 1, each AWG filter unit 31 of FIG. 3 has a single MMI-terminated waveguide as depicted in FIG. 2, its waveguide being depicted at 35 and its MMI section at 36. The MMI sections 36 of all the units 31 are of identical length, a length which differs from that of the MMI section 33 of the unit 30. Each of the N waveguides 34 of unit 30 is optically coupled, by way of one of an associated set of N waveguides 37, with the waveguide 35 of an associated one of the set of N units 31 To the exit end of the second star coupler 12 of each filter unit 31 is connected a single associated waveguide 38.

The AWG unit 30 provides a comb filter function for the passage of light between waveguide 32 and any particular one of the N waveguides 34. Since this unit is performing a wavelength multiplexing/demultiplexing function, it is clear that the precise spectral positioning of the comb filter function is different for the passage of light between waveguide 32 and each different one of the N waveguides 34. This may be alternatively represented by the statement that the AWG unit 30 provides (slightly) different Free Spectral Ranges (FSRs) between waveguide 32 and each one of the N different waveguides 34. In contrast, each of the AWG units 31 has only two external connections, waveguide 36 and waveguide 38, and so possesses only a single FSR and therefore only a single comb filter function.

Typically, when the multiplexer/demultiplexer device of FIG. 3 is being employed as a multiplexer/demultiplexer, there is only one tooth of each comb filter function (only one diffraction order of its grating) that is being actively made use of, and so it is only necessary for there to be registry between this tooth of unit 30 and the corresponding tooth of the relevant AWG unit 31. However, such registry may conveniently be achieved by providing the two AWG units with substantially identical FSRs, thereby providing registry of the entire combs. One way of achieving this registry is to make each unit 31 identical with unit 30, and then to provide each waveguide 38 with the same offset (with respect to its radiative star coupler 12) as that of the waveguide 34 of unit 30 to which that particular unit 31 is connected. A disadvantage of such an approach is that the provision of an offset introduces additional optical loss into the device. It may therefore be preferred not to include offsets in the design of the AWG units 31, but instead to achieve the required FSR matches by employing a (slightly) different value of length increment for the array 10 of each of the units 31.

Figure 4:
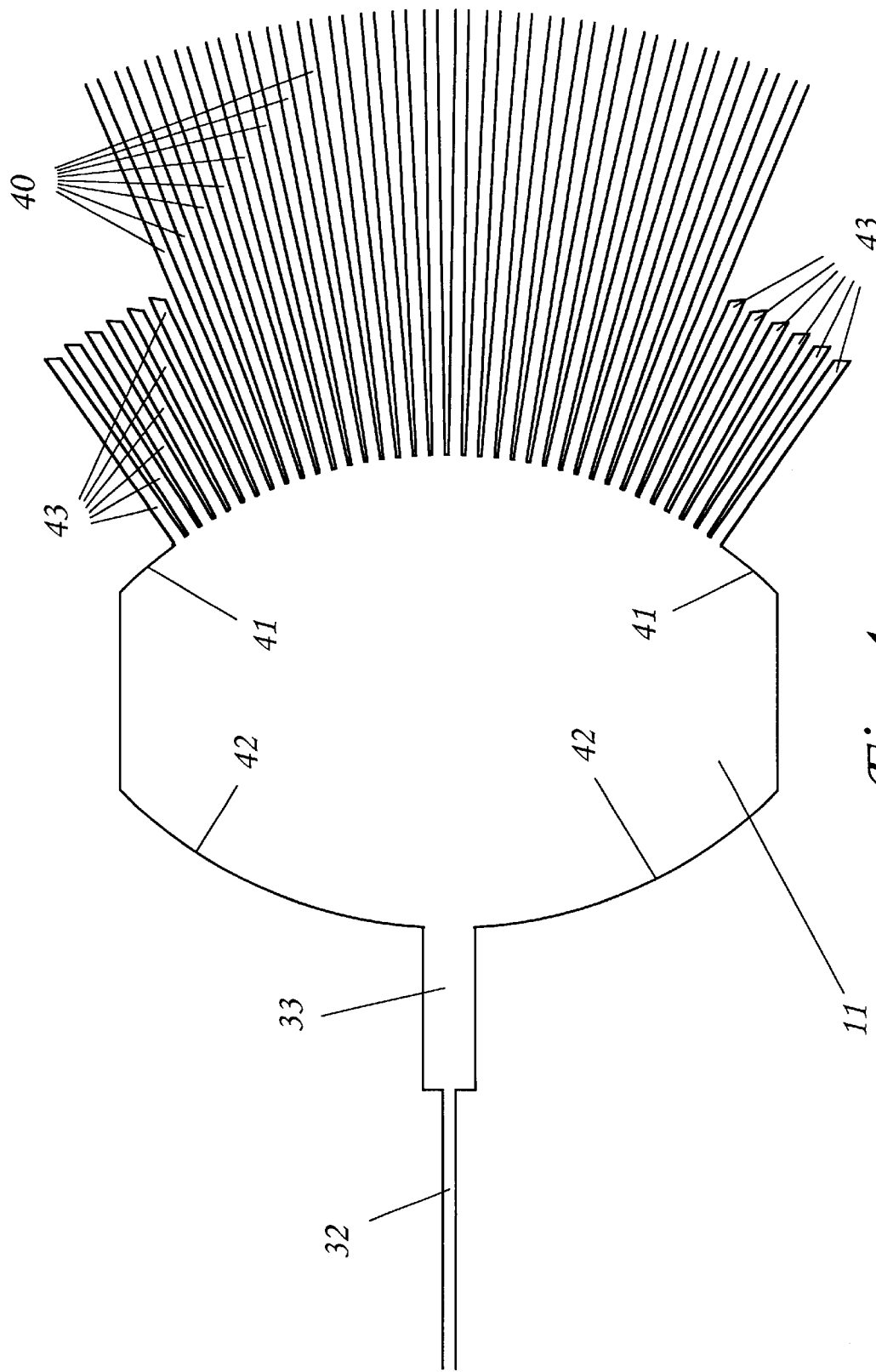
FIGS. 4, 5, 6 and 7 are schematic diagrams depicting, on a larger scale and in greater detail, parts of the device of FIG. 3, FIGS. 8 and 9 are schematic diagrams of alternative forms of comb filter device constructed in accordance with the teachings of the present invention.

FIG. 4 schematically depicts on a larger scale, and in greater detail, the star coupler 11 of multiplexer/demultiplexer unit 30, together with the MMI section 33 and adjacent parts of the AWG array 10 and waveguide 32. In FIG. 4 the individual waveguides of the AWG array 10 are separately depicted as waveguides 40. These waveguides terminate at a part of the boundary 41 of the radiative star coupler 11 that preferably has the form of an arc of a circle centred in the centre of the opposite boundary 42 which preferably has the form of an arc of a circle centred in the centre of the first-mentioned boundary 41. The end sections of the waveguides 40 are disposed radially so that their axes intersect at the centre of curvature of the circular arc 41. Optionally, the set of waveguides 40 is flanked by two sets of dummy waveguides 43 that are also disposed radially, but are terminated obliquely after a short distance. The function of these dummy waveguides 43 is to place the ends of those of the waveguides 40 that are near the side edges of the array in a lateral environment more nearly resembling that of the waveguides 40 further away from those side edges. The axis of the end section of the waveguide 32 and its MMI section 33 lies on the axis of symmetry of the array of radially disposed end sections of waveguides 40.

Figure 5:
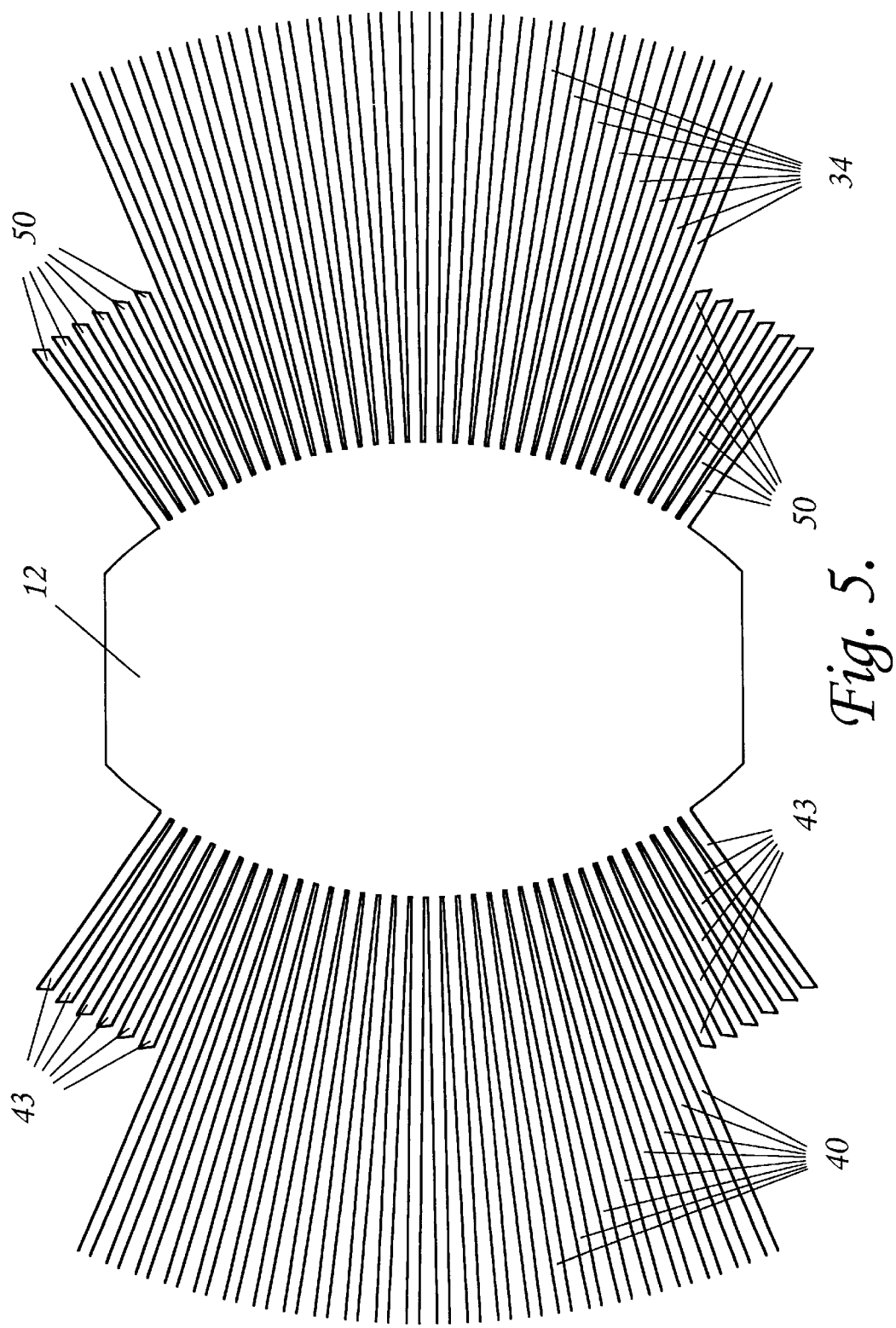

FIG. 5 schematically depicts on the same scale and detail as employed in FIG. 4, the star coupler 12 of multiplexer/demultiplexer unit 30, together with part of its AWG 10 and part of its array of waveguides 34. The configuration of the star coupler 12 is the same as that of star coupler 11. Although this FIG. 5 happens to depict the array of waveguides 34 as being composed of the same number of waveguides as the number of waveguides 40 forming the AWG array, this is not a necessary, or even particularly desirable, relationship. However, the preferred arrangement of the end sections of the waveguides 34 of the array is the same as that of the waveguides 40 insofar as their arrangement is radial so that their axes intersect at the centre of the further end of the star coupler 12. Optionally, the array of waveguides 34 may be flanked with arrays of dummy waveguides 50 that are also disposed radially, but are terminated obliquely after a short distance, these dummy waveguides serving, if provided, substantially the same function as dummy waveguides 43.

Figure 6:
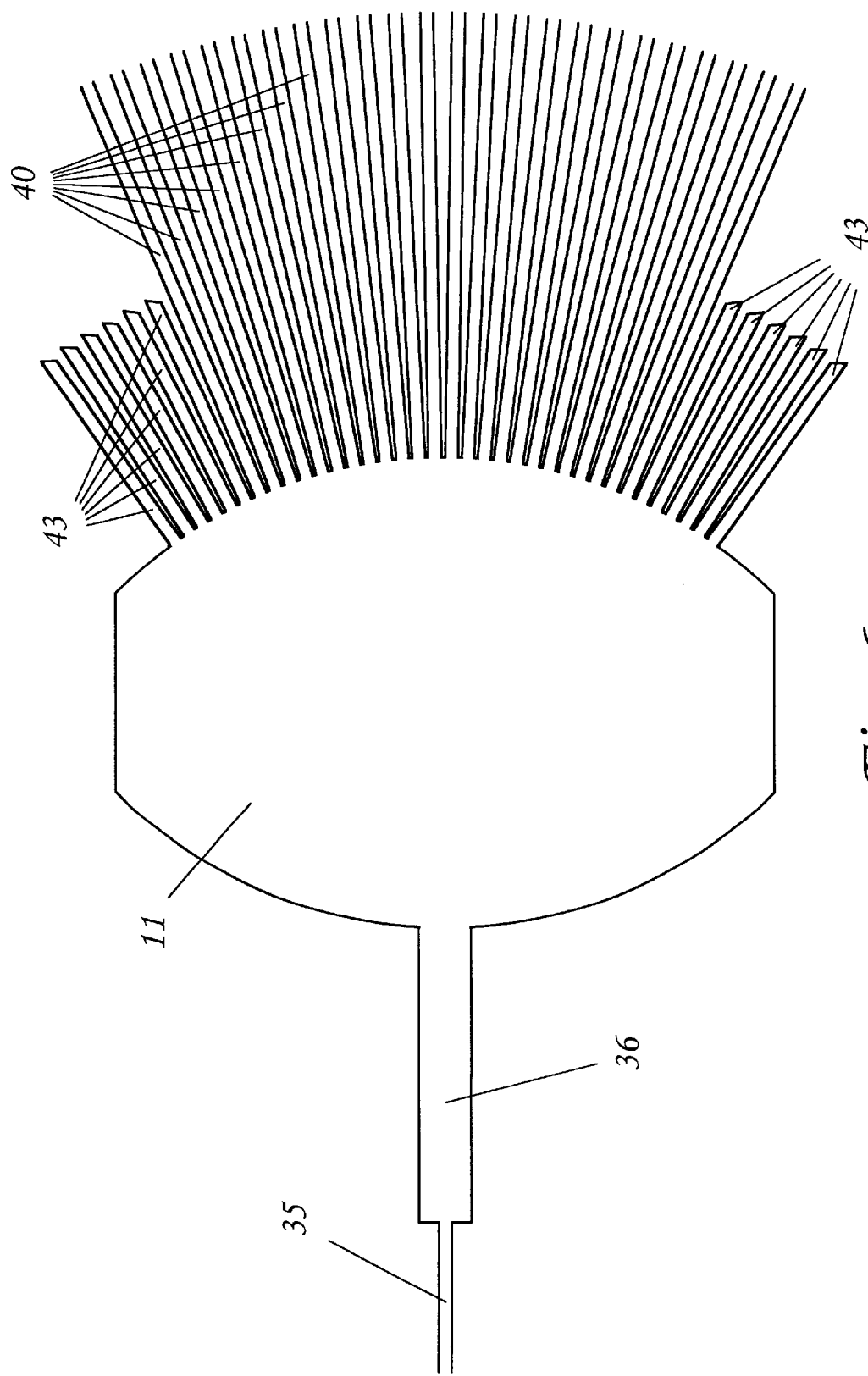
Figure 7:
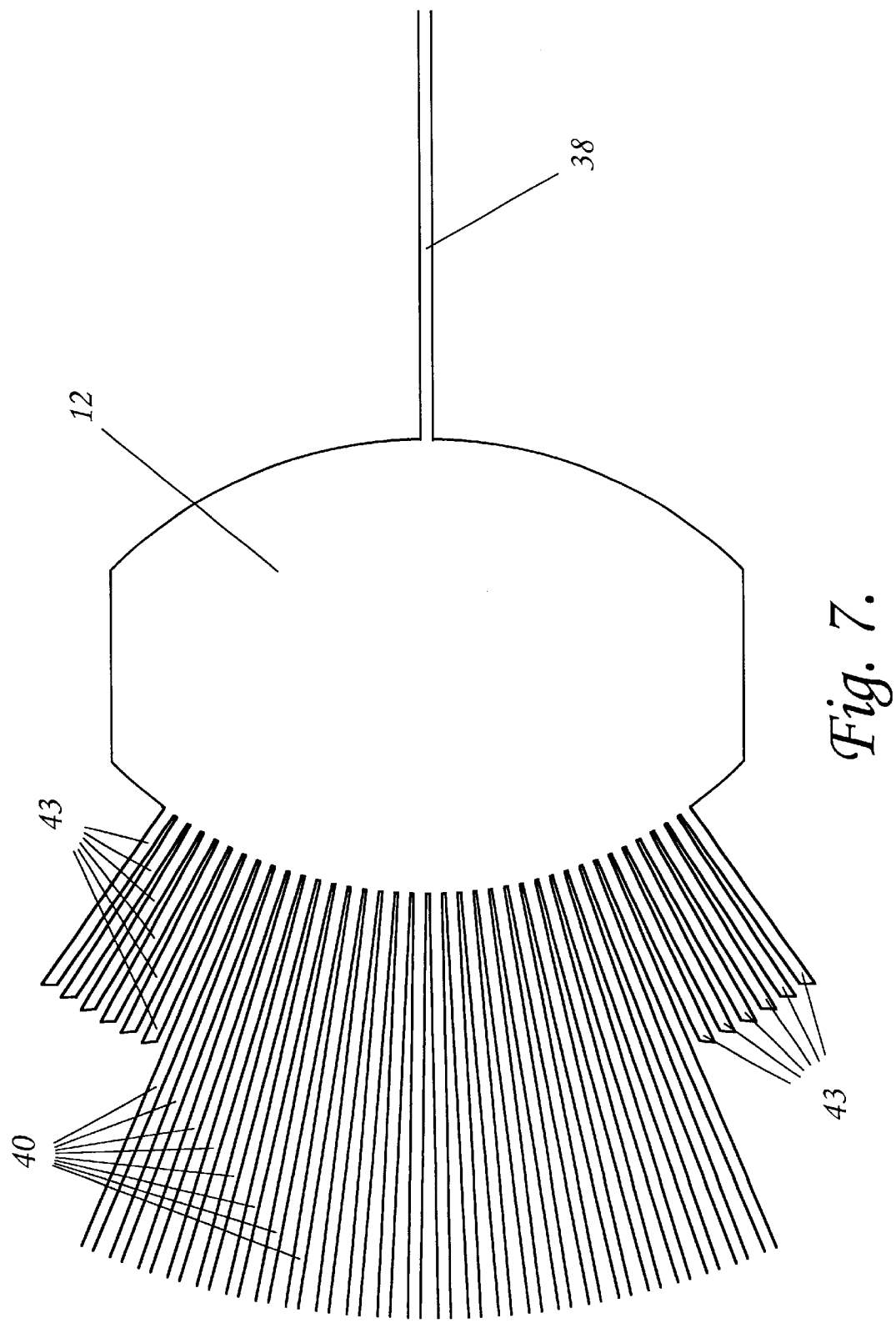

FIGS. 6 and 7 similarly schematically depict on the same scale and detail as employed in FIGS. 4 and 5, respectively the star couplers 11 and 12 of filter unit 31, together with adjacent parts of the waveguides 43 of its AWG array 10 and waveguides 35 and 38, additionally depicting, in the case of the star coupler 11 of FIG. 6, the MMI section 36. The sole difference between the layouts of FIGS. 4 and 6 lies in the lengths of their respective MMI sections 33 and 36. In the case of the layouts of FIGS. 5 and 7, the sole difference lies in the substitution, in FIG. 7, of the single waveguide 38 for the array of waveguides 34 of FIG. 5, the end section of this waveguide 38 being arranged so that its axis lies on the axis of symmetry of the array of radially disposed end sections of waveguides 40.

Reverting attention to the multiplexer/demultiplexer device of FIG. 3, it may be noted that each of its filter units 31 does not have only a single pass-band, but has a set of pass-bands at a frequency spacing equal to its free spectral range (FSR) which is also the FSR of the device. Accordingly, if all that is required is a comb filter function, this can at least in principle be produced by modifying the device of FIG. 3 by replacing the set of waveguides 34 of multiplexer/demultiplexer unit 30 with a single waveguide connected to just one of the filter units 31, and dispensing with the other (N–1) filter units, thereby producing the structure schematically depicted in FIG. 8.

Figure 10:
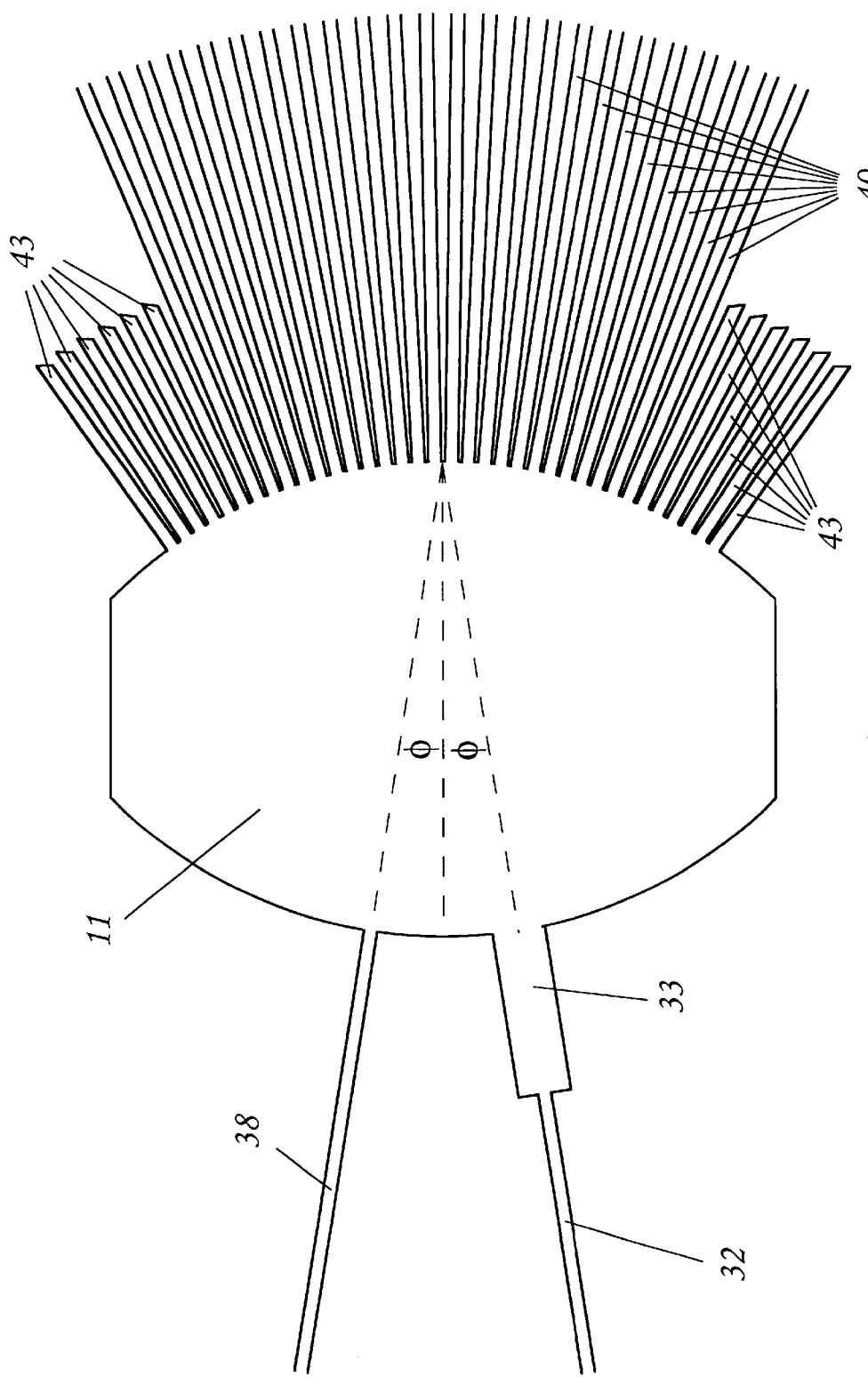
FIGS. 10 and 11 are schematic diagrams depicting, on a larger scale and in greater detail, parts of the device of FIG. 9, FIGS. 12, 13 and 14 are schematic diagrams of successive stages in the construction of an integrated waveguide optical device in which a multiplexer/demultiplexer embodying the invention in a preferred form is formed.
Figure 11:
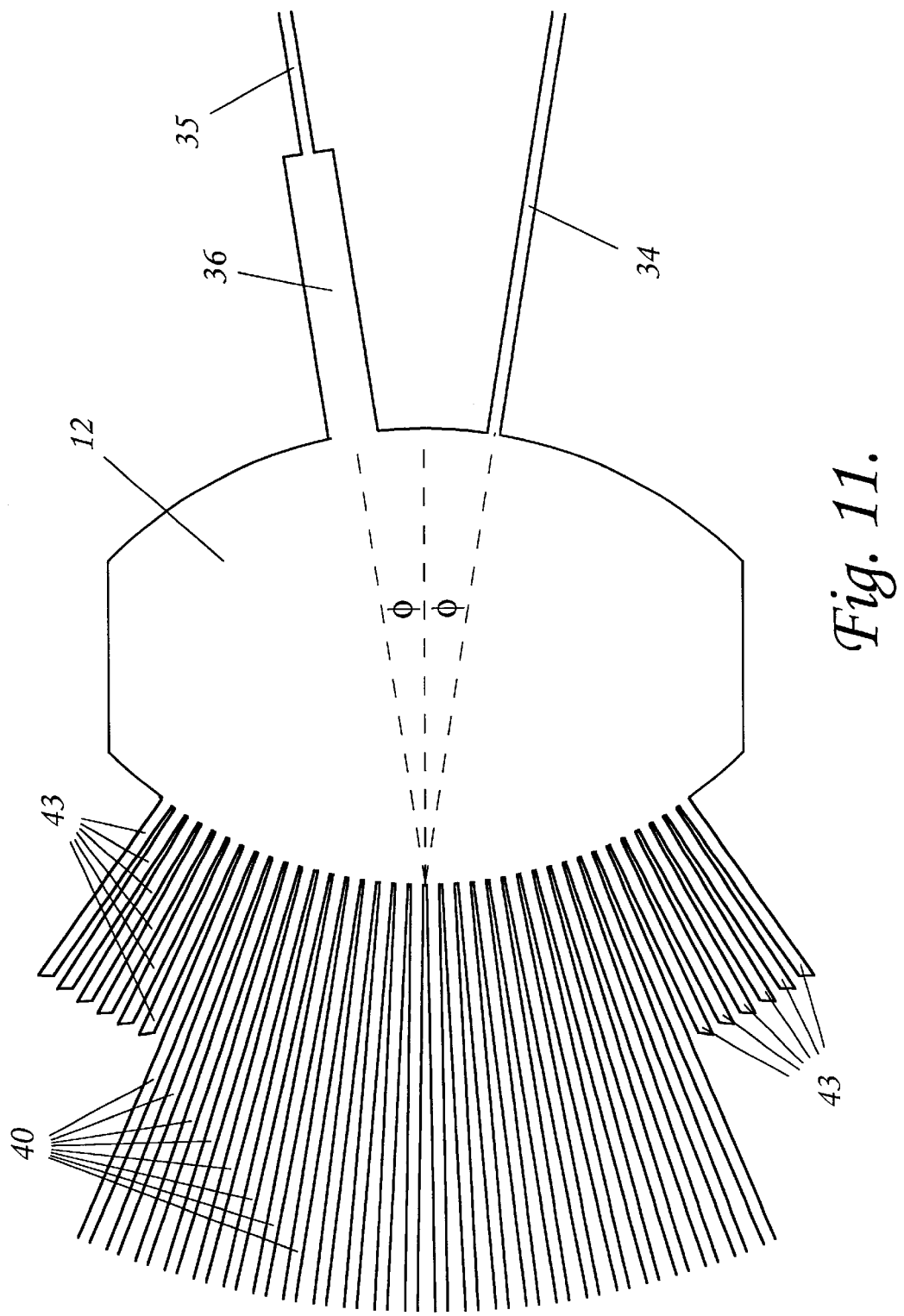

The two AWGs 10 of the comb filter structure of FIG. 8 are identical, but one of them can be dispensed with by directing the light through the remaining AWG 10 first in one direction, and then in the other, using a configuration as schematically depicted in FIG. 9. In this configuration one of the MMI-terminated waveguides, comprising waveguide 32 and MMI section 33, abuts the end of star coupler 11 in side-by-side relationship with waveguide 38. Similarly, the other of the MMI-terminated waveguides, comprising waveguide 35 and MMI section 36, abuts the end of star coupler 12 in side-by-side relationship with waveguide 34. In view of these side-by-side relationships, it is clear that waveguides 32 and 38 can not both be aligned with the symmetry axis of the radially disposed end sections of the array of waveguides 40 of AWG 10. Nor either can the axes of waveguides 35 and 34 both be aligned with this symmetry axis. Accordingly the axes of the end sections of these four waveguides are each inclined to this symmetry axis at an angle $\phi$, as schematically depicted in FIGS. 10 and 11, with each of these four waveguide axes intersecting the symmetry axis at the remote end of the star coupler to which that waveguide is abutted.

Under these conditions, the set of pass-bands afforded by the AWG 10 for light propagating from waveguide 32 to waveguide 34 are matched with those for light propagating from waveguide 35 to waveguide 38. Waveguide 34 is optically coupled with waveguide 35 via an optical path 91 that includes an optical isolator 90. The need for this optical isolator 90 arises because the AWG 10 also affords a frequency displaced set of pass-bands to light propagating from waveguide 32 to waveguide 35, and from waveguide 34 to waveguide 38.

If the optical path 91 is constructed in polarisation state preserving waveguide, there can be advantage in connecting its ends so that the polarisation state with which light emerges from the AWG 10 into waveguide 34 is orthogonal to the polarisation state with which that light is launched back into the AWG 10 from waveguide 35. This is because any polarisation dependent effects consequent upon the light making its first transit through the AWG 10 are substantially compensated when it makes its second transit.

In the foregoing description with particular reference to FIGS. 3 and 4 the AWG unit 30 has been described as having its MMI section 33 terminated waveguide 32 at radiative star coupler 11 but, inasmuch as this AWG unit is a reciprocal device, it will be evident that the place of the MMI section 33 on waveguide 32 could alternatively be taken by a set of N such MMI sections, one terminating each one of the waveguides 34 at radiative star coupler 12. By the same reasoning, it is clear that the place of MMI section 36 of any or all of the AWG units 31 can be switched from waveguide 35 to waveguide 38. Similarly, in the case of the AWG unit of FIG. 9, it can be seen that the two MMI sections 33 and 36 can be located on any pair of the four waveguides 32, 34, 36 and 38. Thus, for instance, if the MMI units 33 and 36 respectively terminate waveguides 32 and 34, then the filter's input is provided by way of waveguide 38, the relevant matching FSRs are those between waveguides 38 and 34 and between waveguides 36 and 32, and the filter's output is provided by way of waveguide 32.

Earlier, reference has been made to the fact that waveguides may incorporate adiabatic tapers, but even where any of the waveguides 32, 34, 35, 38 and 40 have, in physical reality, incorporated such tapers, these tapers have not, for convenience of illustration, been specifically illustrated in any of the FIGS. 4 to 7, 10 and 11.

Figure 12:
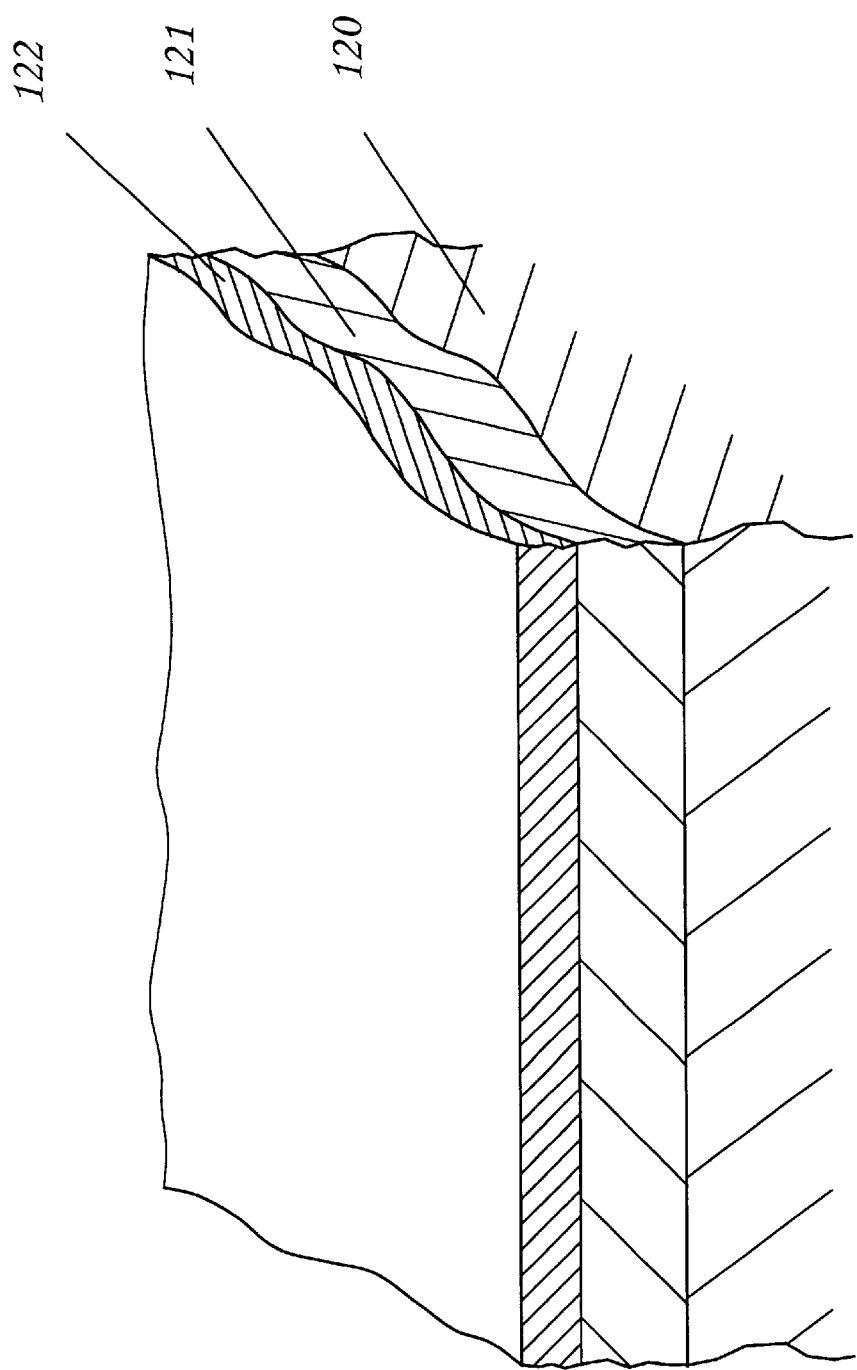
Figure 13:
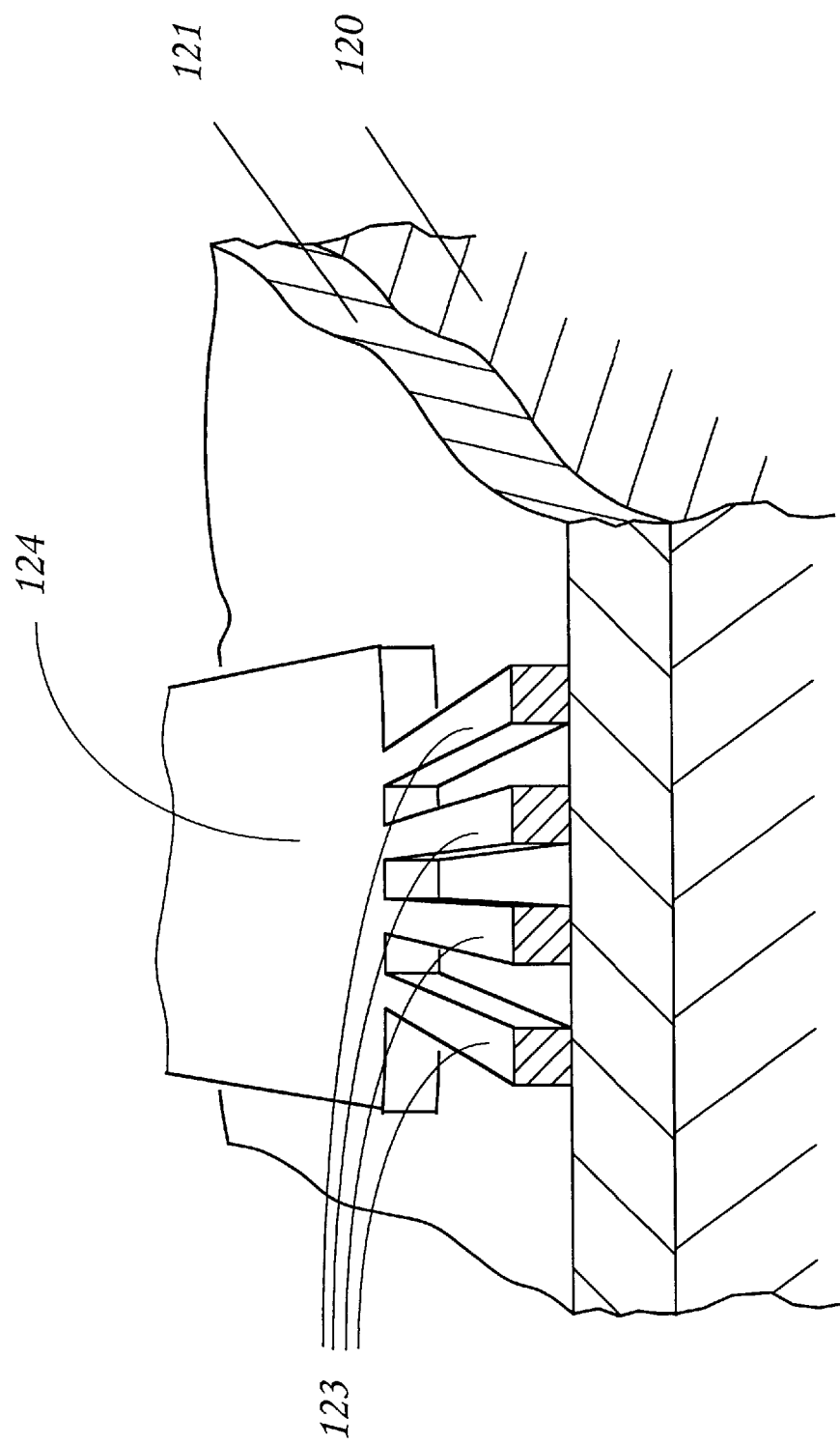
Figure 14:
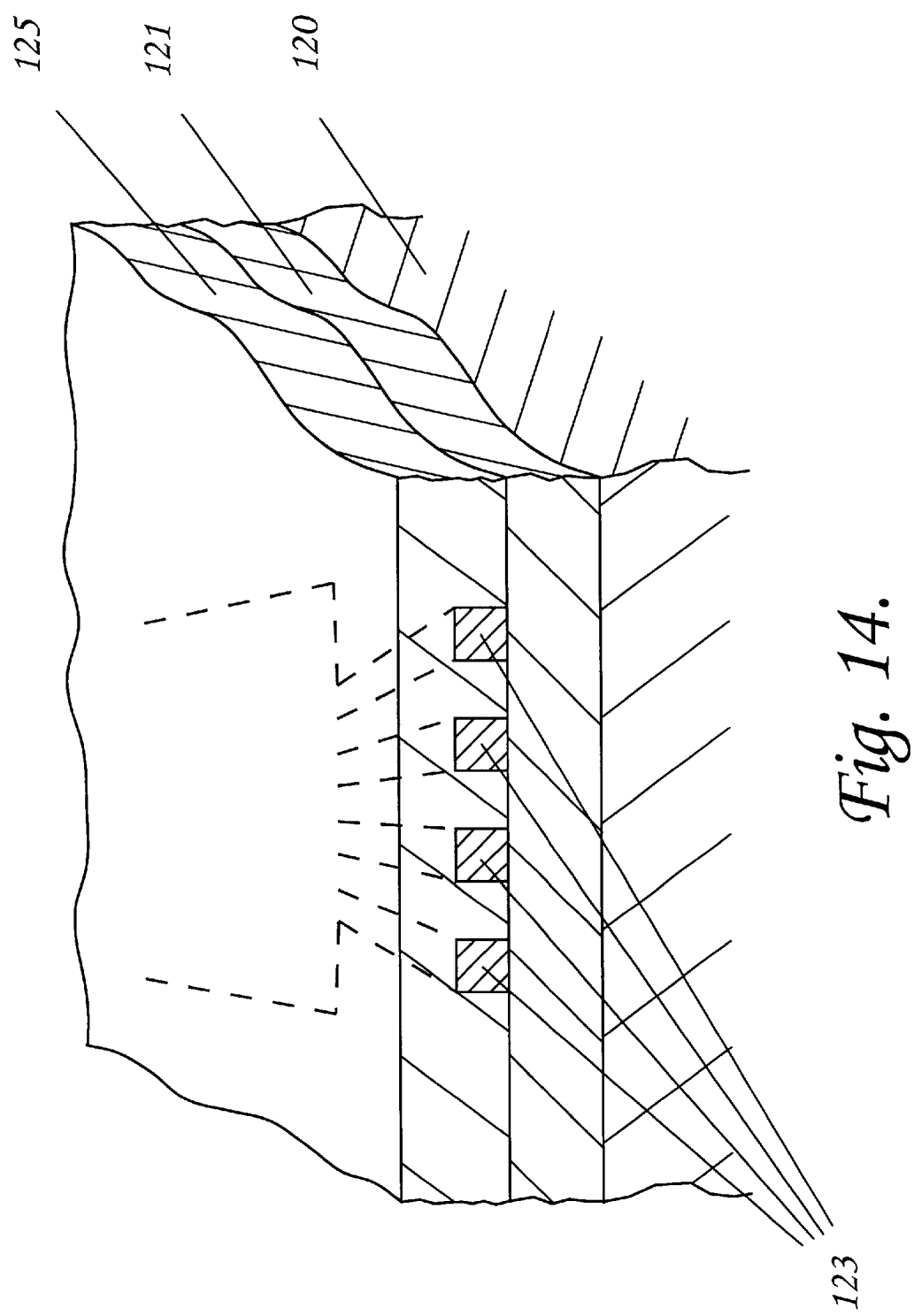

The method of constructing the AWGs 10 of FIGS. 3 to 11 uses a known form of processing to create the required configuration of optical waveguides in an integrated waveguide optics structure. Successive stages of this processing are schematically illustrated in FIGS. 12, 13 and 14. Referring in the first instance to FIG. 12, a layer 121 of cladding glass, typically a layer of silica, is deposited upon a planar substrate 120, typically a silicon substrate. On layer 121 is deposited a layer 122 of core glass having a refractive index a controlled amount greater than that of the cladding glass layer upon which it is deposited. Typically the core glass layer 122 is composed of doped silica. Standard photolithographic techniques are then used to pattern this layer to define the required configuration of waveguides. The portion of integrated waveguide optics structure illustrated in FIGS. 12, 13 and 14 includes portions of a number of optical waveguides 123 in each of which a waveguiding effect is provided both in the direction normal to the plane of the layer 122 and in the direction lying in the plane of that layer that is at right-angles to the axial direction of that waveguide. For convenience of illustration, only four of those waveguides 123 have been specifically illustrated in FIGS. 13 and 14, though it is to be understood that in practice a grating may typically actually have between 20 and 30 of such waveguides. These four waveguides 123 are shown terminating in a planar waveguide region 124, part of one of the star couplers 11 or 12 in which there is still a waveguiding effect in the direction normal to the plane of layer 122, but in which light is able to radiate laterally from any one of the waveguides 123. After completion of the patterning of layer 122, it is covered with a further layer 125 of cladding glass whose refractive index is less than that of core glass layer 122, preferably having an index matched with that of cladding glass layer 121. Typically this cladding glass layer 125 is also made of doped silica, the doping in this instance not being chosen to raise the refractive index of the host material, but to lower its flow temperature.

Attention is now turned to how the respective lengths of the two MMI sections 33 and 36 may be selected to achieve the required field distributions with substantially complementary curvatures.

For this purpose, the propagation of light through the AWG device is modelled as a function of optical frequency for a range of device parameter values using the Effective Index Method (EIM) described for instance at pages 90–91 of the book by J Carroll et al. entitled, 'Distributed feedback semiconductor lasers' published in 1998 by The Institute of Electrical Engineers (ISBN 0 85296 917 1). The EIM approach provides an effective one-dimensional waveguide refractive index profile whose propagation characteristics model those of an actual two-dimensional waveguide refractive index profile. The EIM is particularly suited for analysing light propagation in an AWG device because in such a device the refractive index profile of its waveguides in the direction normal to the plane of the substrate surface upon which the waveguides are supported is the same throughout the device. The chosen orientation of the one-dimension of the effective one-dimensional waveguide refractive index profile is the direction that is contained in the plane of the substrate surface upon which the waveguides are supported, and is at right-angles to the axis of that waveguide (i.e. it describes a lateral profile). Once the refractive index and dimensional parameters of the two-dimensional waveguide that constitutes the input waveguide of the AWG device have been employed to determine the equivalent parameters of its effective one-dimensional waveguide counterpart, the modelling continues with the calculation of the (lateral) electric field distribution of the guided zeroth order mode in this effective one-dimensional waveguide.

If there is an MMI section between the input waveguide and the first radiative star coupler of the AWG device, then the excitation of the various guided modes in the MMI section are calculated from the overlap integral of each of its guided modes with the input excitation field. The output from the MMI section is calculated from the summation of the field distribution of each of these guided modes, with an appropriate phase shift corresponding to the propagation along the MMI section. If there is no MMI section, then the field profile of the zeroth order mode in the input guide is launched straight into the first radiative star coupler. The complex field distribution on the far side of the first star coupler is calculated allowing for free diffraction across this star coupler.

The effective one-dimensional waveguide counterparts of the two-dimensional waveguides that constitute the waveguides of the grating array are calculated using the EIM in the same way as for the input waveguide. As before, overlap integrals are used to calculate the excitation of the guided modes. In this case the field pattern that has propagated across the star coupler, and that of the zeroth order mode at the input end of each array waveguide, are used to calculate the strength of the excitation of the mode guided in that array waveguide. The propagation through each array waveguide is often assumed to be independent of every other array waveguide. In practice there will be at least some lateral coupling between adjacent waveguides of the array, especially near their ends where they are more closely spaced than elsewhere, but it is often found that the effect of this coupling is small enough for it to be unnecessary to take account of it in the calculation. The complex field at the output of each array waveguide, where it abuts the second radiative star coupler, is calculated from the input field, allowing for the appropriate phase shift associated with the propagation along the specific length of that array waveguide. If there is significant differential attenuation between the different waveguides of the array, this will also need to be taken into account in the calculation.

The effective one-dimensional waveguide counterpart of the or each output waveguide whose input end abuts the second radiative star coupler is calculated using the EIM in the same way as for the input waveguide. The complex field profile in the plane of the or each output waveguide at the output of the second star coupler is calculated by allowing for the free diffraction from each array waveguide across the star coupler. Finally the strength of the zeroth order mode excitation in the output waveguide, and its phase, are estimated from the overlap integral of the complex field profile at the output of the second star coupler with the zeroth order mode at the input of the or each output waveguide. The calculation thus provides an electric field vector in the complex form $E_r+jE_j$, which describes the amplitude and phase of the light output from the AWG device in relation to the light input to the device with an electric vector E. The amplitude and phase ($\phi$) response of the AWG device as a function of optical frequency can then be built up by iterating the calculation process for a family of spectrally adjacent optical frequencies. Then, it is possible to evaluate the group delay, $\tau_g$, where $\tau_g=d\phi/d\omega$, and $\omega=2\pi f$ and f is the optical frequency.

In the case of an AWG device with a single MMI section in its single input waveguide, two design variables are immediately apparent, the width of the MMI section, and its length. In fact there are two further design variables, namely the width of the input waveguide where it abuts the MMI section, and the width of the or each output waveguide where it abuts the second radiative star coupler. These latter two widths are not necessarily preserved for the full lengths of their respective input and output waveguides, but may be linked by adiabatic tapers with regions of different width.

These calculations enable an assessment of the performance of the AWG device design to be made in terms of the additional attenuation resulting from the use of the MMI section, the Figure of Merit (FoM) of the spectral profile of the device (conveniently expressed in terms of the −0.5 dB and −30.0 dB spectral widths), and the ripple in its passband (conveniently expressed in terms of the difference in dBs between the highest peak of the pass-band and its lowest trough). Following on from this, it is possible to repeat the calculations for different values of the four variables, for instance exploring the effect of varying the magnitude of each variable in turn while the others are maintained constant, in order to build up a map of how the four variables tend to affect performance, and thereby enable the selection of optimised values.

The ensuing table sets out the calculation results in respect of an AWG device designed to have a free spectral range (FSR) approximately equal to 100 GHz, a channel spacing of half this value and a centre (free space) wavelength of 1545 nm. The refractive index of its optical cladding is 1.4464, while that of its waveguide cores is 1.4574. The waveguide cores are 7 μm thick and, except where specially widened, are 5.5 μm wide. The grating array consists of 15 array waveguides that are on a pitch of 25 μm where their ends abut the first and second radiative star couplers of the device. At these ends, the width of each array waveguide is 21.5 μm. The set of output waveguides are on a pitch of 35 μm where their ends abut the second radiative star coupler. In the ensuing table, $W_i$ is the width of the input waveguide where it abuts the MMI section; $W_s$ is the width of the MMI section, while $L_s$, is its length; $W_o$, is the width of the output waveguide where it abuts the second radiative star coupler; A (dB) is the additional attenuation of the device, FoM is its Figure of Merit, and R (dB) is the ripple.

| $W_i$ | $W_s$ | $W_o$ | $L_s$ | A (dB) | FoM | R (dB) |
|---|---|---|---|---|---|---|
| 10 | 30 | 12 | 370 | 4.37 | 0.14 | 0.68 |
| 11 | 30 | 12 | 370 | 4.22 | 0.17 | 0.54 |
| 11.5 | 30 | 12 | 370 | 4.14 | 0.47 | 0.48 |
| 12 | 30 | 12 | 370 | 4.07 | 0.45 | 0.42 |
| 13 | 30 | 12 | 370 | 3.92 | 0.43 | 0.3 |
| 14 | 30 | 12 | 370 | 3.76 | 0.41 | 0.19 |
| 16 | 30 | 12 | 370 | 3.45 | 0.37 | 0 |
| 14 | 30 | 12 | 360 | 3.59 | 0.34 | 0 |
| 14 | 30 | 12 | 365 | 3.68 | 0.38 | 0.31 |
| 14 | 30 | 12 | 370 | 3.76 | 0.41 | 0.19 |
| 14 | 30 | 12 | 375 | 3.85 | 0.43 | 0.15 |
| 14 | 30 | 12 | 380 | 3.94 | 0.45 | 0.17 |
| 14 | 30 | 12 | 390 | 4.12 | 0.47 | 0.34 |
| 14 | 30 | 12 | 400 | 4.31 | 0.49 | 0.62 |
| 14 | 30 | 12 | 410 | 4.5 | 0.51 | 0.91 |
| 14 | 27 | 12 | 370 | 3.97 | 0.48 | 0.92 |
| 14 | 28 | 12 | 370 | 4.01 | 0.48 | 0.71 |
| 14 | 28.5 | 12 | 370 | 3.98 | 0.47 | 0.53 |
| 14 | 29 | 12 | 370 | 3.92 | 0.45 | 0.25 |
| 14 | 30 | 12 | 370 | 3.76 | 0.41 | 0.19 |
| 14 | 30.5 | 12 | 370 | 3.67 | 0.35 | 0 |
| 14 | 31 | 12 | 370 | 3.58 | 0.17 | 0 |
| 14 | 32 | 12 | 370 | 3.41 | 0.14 | 0 |
| 14 | 30 | 9 | 370 | 4.36 | 0.46 | 0.3 |
| 14 | 30 | 10 | 370 | 4.17 | 0.45 | 0.27 |
| 14 | 30 | 11 | 370 | 3.96 | 0.43 | 0.25 |
| 14 | 30 | 12 | 370 | 3.76 | 0.41 | 0.19 |
| 14 | 30 | 13 | 370 | 3.57 | 0.39 | 0.21 |
| 14 | 30 | 14 | 370 | 3.38 | 0.37 | 0 |

Figure 15:
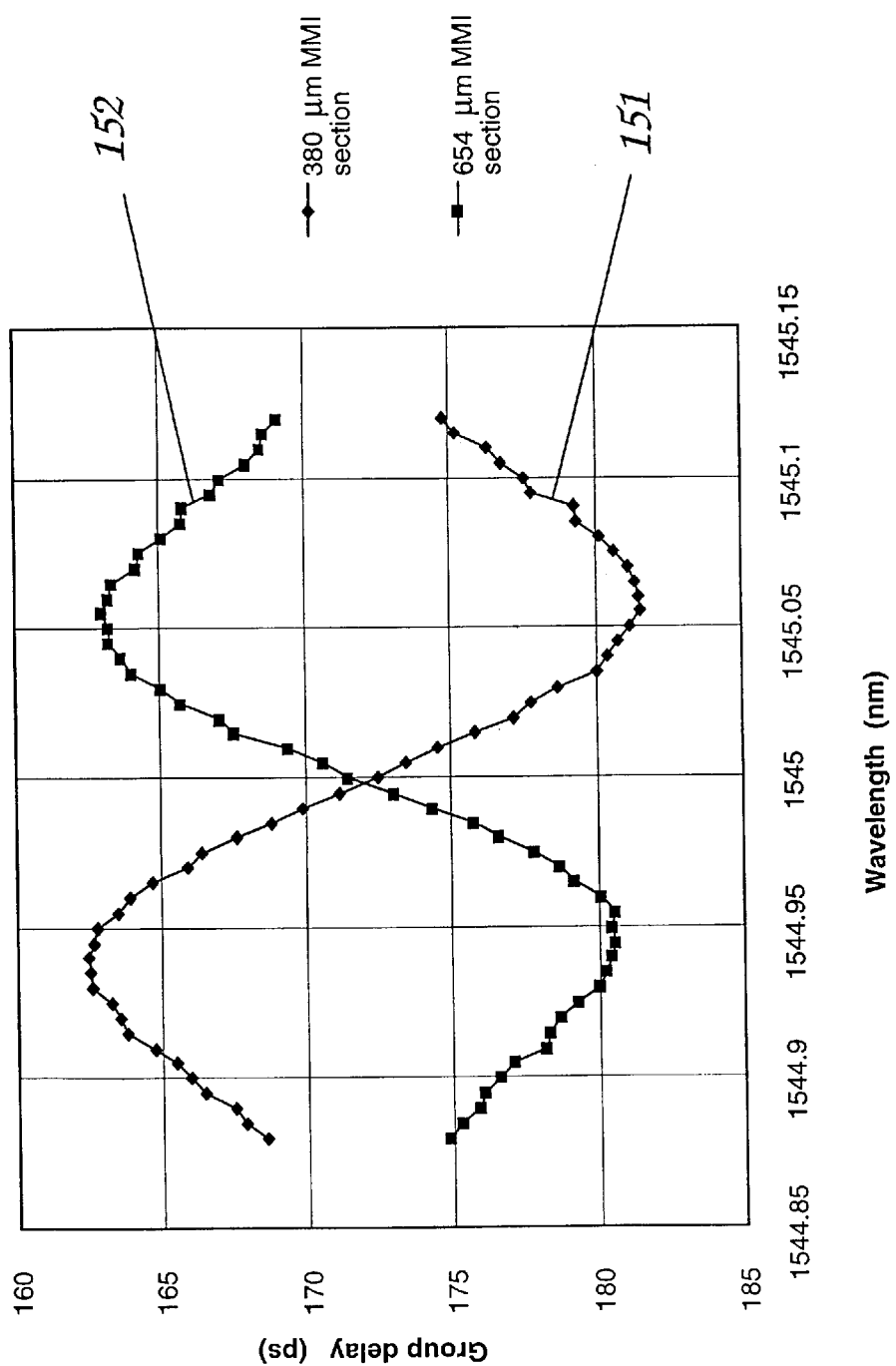
FIG. 15 depicts group delay plots of two simulated AWG devices exhibiting substantially complementary group delay characteristics.

From the foregoing table was selected the design that has an input waveguide width, $W_i$, of 14 μm, an output waveguide width, $W_o$, of 12 μm, an MMI section width, $W_s$, of 30 μm and length, $L_s$, of 380 μm. Trace 151 of FIG. 15 depicts the calculated group delay exhibited by this AWG device, calculated on the basis that the individual array waveguides are subject to statistically distributed optical path length errors of a magnitude not exceeding 75 nm. The group delay is thus seen to vary, within the pass-band, in a highly non-linear way with a range of more than 15 ps. The MMI section length of 380 μm is not equal to the length, 517 μm, for which such an MMI section affords a phase slippage of π between the zeroth and second order modes, being less than this value by 137 μm. Trace 152 of FIG. 15 depicts the calculated group delay exhibited by a second AWG device only in respect of the length of its MMI section, this length being 654 μm. It is thus seen that complementary group delay characteristics, and hence substantially complementary phase curvatures, are provided by pairs of matching AWG devices that differ only in respect of the length of their respective MMI sections, one being such that the phase slippage between zeroth and second order modes is (π−ψ), while that of the other is (π+ψ).

What is claimed is:

1. An arrayed waveguide grating device having an input/output waveguide optically coupled with an output/input waveguide via an optical path that includes, optically in series, first and second arrayed waveguide gratings configured to exhibit matched free spectral ranges to said optical path, each of which arrayed waveguide gratings having first and second ends respectively terminating in first and second radiative star couplers associated with that arrayed waveguide grating, which optical path additionally includes an intermediate waveguide that optically couples the second radiative star coupler of the first arrayed waveguide grating with the first radiative star coupler of the second arrayed waveguide, and which optical path also includes first and second multimode interference waveguide sections respectively terminating in one of the radiative star couplers of the first arrayed waveguide grating and in one of the radiative star couplers of the second arrayed waveguide grating, and wherein the first and second multimode interference waveguide sections support at least the zeroth, second and fourth order modes, and their relative lengths are such that, in respect of light launched into their respective waveguides, they produce, where they terminate in their respective radiative star couplers, field distribution phase fronts possessing substantially complementary curvatures.

2. A device as claimed in claim 1, wherein said input/output and output/input waveguides of the device are the sole input/output and output/input waveguides of the device.

3. An arrayed waveguide grating comb filter device having an arrayed waveguide grating optically coupled via a first radiative star coupler with first and second waveguides, respectively constituting an input/output port and an output/input port of the device, and coupled via a second radiative star coupler with third and fourth waveguides, which comb filter also includes first and second multimode interference waveguide sections each of which supports at least the zeroth, second and fourth order modes and provides an indirect coupling between a respective one of two of said first to fourth waveguides and its respective one of said first and second radiative star couplers while each of the other two of said first to fourth waveguides is directly coupled with its respective one of said first and second radiative star couplers, wherein the third waveguide is optically coupled with the fourth waveguide via an optical isolator, and wherein the relative lengths of the first and second multimode interference waveguide sections are such that, in respect of light launched into their respective waveguides, they produce, where they terminate in their respective radiative star couplers, field distribution phase fronts possessing substantially complementary curvatures.

4. A device as claimed in claim 3, wherein the third and fourth waveguides are coupled via the isolator such that light of any polarisation state launched into the third waveguide from the second radiative star coupler is launched from the fourth waveguide back into the second radiative star coupler in the orthogonal polarisation state.

* * * * *